(12) United States Patent
Varma et al.

(10) Patent No.: US 9,513,688 B2
(45) Date of Patent: Dec. 6, 2016

(54) MEASUREMENT OF PERFORMANCE SCALABILITY IN A MICROPROCESSOR

(71) Applicant: Intel Corporation, Santa Clara, CA (US)

(72) Inventors: Ankush Varma, Hillsboro, OR (US); Krishnakanth V. Sistla, Beaverton, OR (US); Jeremy J. Shrall, Portland, OR (US); Avinash N. Ananthakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 490 days.

(21) Appl. No.: 13/844,815

(22) Filed: Mar. 16, 2013

(65) Prior Publication Data

US 2014/0281612 A1 Sep. 18, 2014

(51) Int. Cl.
*G06F 1/00* (2006.01)
*G06F 1/32* (2006.01)

(52) U.S. Cl.
CPC ............. *G06F 1/324* (2013.01); *G06F 1/3203* (2013.01); *G06F 1/3206* (2013.01); *Y02B 60/1217* (2013.01)

(58) Field of Classification Search
CPC .. G06F 1/3203; G06F 1/324; Y02B 60/1217
See application file for complete search history.

(56) References Cited

U.S. PATENT DOCUMENTS

| | | |
|---|---|---|
| 7,353,338 B2 | 4/2008 | Liu et al. |
| 7,360,008 B2 | 4/2008 | Sistla et al. |
| 7,502,889 B2 | 3/2009 | Sistla |
| 7,590,805 B2 | 9/2009 | Sistla et al. |
| 7,644,293 B2 | 1/2010 | Sistla et al. |
| 7,685,441 B2 | 3/2010 | Burton et al. |
| 7,689,778 B2 | 3/2010 | Liu et al. |
| 7,730,264 B1 | 6/2010 | Sistla |
| 7,730,266 B2 | 6/2010 | Sistla et al. |
| 7,827,357 B2 | 11/2010 | Sistla |
| 7,861,068 B2 | 12/2010 | Gorbatov et al. |
| 7,971,074 B2 | 6/2011 | Liu et al. |
| 7,991,966 B2 | 8/2011 | Sistla |
| 8,028,131 B2 | 9/2011 | Sistla |
| 8,037,326 B2 | 10/2011 | Burton et al. |
| 8,117,478 B2 | 2/2012 | Liu et al. |
| 8,131,940 B2 | 3/2012 | Sistla et al. |
| 8,151,059 B2 | 4/2012 | Sistla |
| 8,169,850 B2 | 5/2012 | Sistla et al. |
| 8,171,231 B2 | 5/2012 | Sistla |
| 8,219,993 B2 | 7/2012 | Johnson et al. |
| 8,510,740 B2 | 8/2013 | Salsbery et al. |

(Continued)

*Primary Examiner* — Mohammed Rehman
*Assistant Examiner* — Gayathri Sampath
(74) *Attorney, Agent, or Firm* — Trop, Pruner & Hu, P.C.

(57) ABSTRACT

A scalability algorithm causes a processor to initialize a performance indicator counter, operate at an initial frequency of the first clock signal for a first duration, and determine, based on the performance indicator counter, an initial performance of the first processing core. The algorithm may then cause the processor to operate at a second frequency of the first clock signal for a second duration and determine, based on the performance indicator counter, a second performance of the first processing core. A performance scalability of the first processing core may be determined based on the initial performance and the second performance and an operational parameter, such as one or more clock frequencies and/or supply voltage(s), may be changed based on the determined scalability.

18 Claims, 7 Drawing Sheets

(56) References Cited

U.S. PATENT DOCUMENTS

| | | | |
|---|---|---|---|
| 2003/0097603 A1* | 5/2003 | Athas .................. G06F 1/206 713/500 |
| 2003/0165084 A1 | 9/2003 | Blair et al. |
| 2004/0025069 A1 | 2/2004 | Gary et al. |
| 2005/0132238 A1 | 6/2005 | Nanja |
| 2006/0117202 A1 | 6/2006 | Magklis et al. |
| 2006/0129852 A1* | 6/2006 | Bonola .............. G06F 1/3203 713/300 |
| 2007/0234091 A1 | 10/2007 | Vishin et al. |
| 2008/0098254 A1 | 4/2008 | Altevogt et al. |
| 2008/0162965 A1* | 7/2008 | Marinas et al. ............ 713/320 |
| 2008/0189569 A1* | 8/2008 | Chu .......................... 713/600 |
| 2008/0201591 A1* | 8/2008 | Hu .................... G06F 1/3203 713/323 |
| 2008/0235364 A1 | 9/2008 | Gorbatov et al. |
| 2008/0263376 A1 | 10/2008 | Magklis et al. |
| 2008/0307245 A1* | 12/2008 | Cesare et al. ................. 713/340 |
| 2009/0013201 A1* | 1/2009 | He ....................... G06F 1/3203 713/322 |
| 2009/0037712 A1 | 2/2009 | Mallik et al. |
| 2009/0125749 A1* | 5/2009 | Weiberle et al. ............. 713/501 |
| 2009/0150693 A1 | 6/2009 | Kashyap et al. |
| 2010/0094572 A1 | 4/2010 | Chase et al. |
| 2010/0095137 A1 | 4/2010 | Bieswanger et al. |
| 2010/0146316 A1* | 6/2010 | Carter et al. ................. 713/322 |
| 2011/0022833 A1* | 1/2011 | Nussbaum ............. G06F 1/324 713/100 |
| 2011/0154321 A1 | 6/2011 | Tian et al. |
| 2012/0198255 A1 | 8/2012 | Chase et al. |
| 2013/0127550 A1 | 5/2013 | Sutardja et al. |
| 2013/0173948 A1 | 7/2013 | Magklis et al. |
| 2013/0205126 A1 | 8/2013 | Kruglick |

* cited by examiner

MEASUREMENT OF PERFORMANCE SCALABILITY IN A MICROPROCESSOR

TECHNICAL FIELD

Embodiments described herein generally relate to microprocessors and, in particular, to the ability to influence performance and power consumption by changing clock frequency.

BACKGROUND

Scalability, in the context of processor performance, refers to a measure of the gain in workload performance as a function of clock signal frequency. Power management algorithms may make power/performance decisions based on assumptions about a processor's scalability. However, because scalability may be difficult to predict or estimate, the decisions based on those estimates and productions may be unreliable.

DESCRIPTION OF EMBODIMENTS

Figure 1:
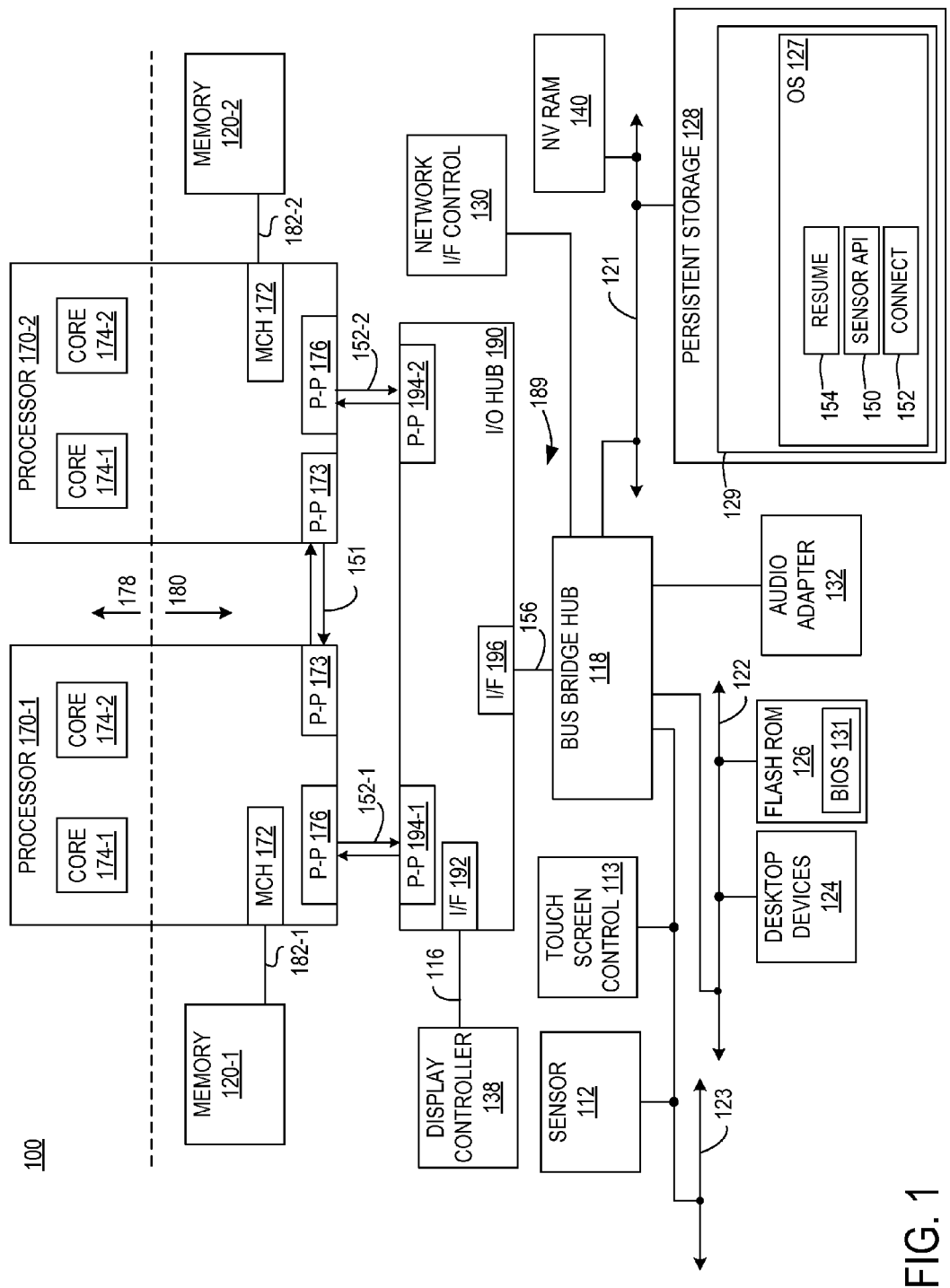
FIG. 1 illustrates a multi-core processor used in conjunction with at least one embodiment.

In at least one embodiment, a computer system includes a multi-core processor that includes a first processing core and a second processing core. In at least one embodiment, the computer system includes a power control unit to provide a first clock signal to the first processing core and a second clock signal to the second processing core. The first and second clock signals may have the same frequency, and in other embodiments, may have independent and different frequencies. In at least one embodiment, the computer system includes computer readable memory to store scalability algorithm instructions. In at least one embodiment, the scalability algorithm instructions are executable to cause the processor to initialize a performance indicator counter, operate at an initial frequency of the first clock signal for a first duration, and determine, based on the performance indicator counter, an initial performance of the first processing core. In at least one embodiment, the algorithm instructions include instructions to operate at a second frequency of the first clock signal for a second duration and determine, based on the performance indicator counter, a second performance of the first processing core. A performance scalability of the first processing core may be determined based on the initial performance and the second performance.

In at least one embodiment, the scalability algorithm instructions are executable to cause the processor to operate at a third frequency of the first clock signal. In some embodiments, the third frequency is based on the performance scalability. In some embodiments, the performance indicator counter indicates instructions that are retired by the first processing core or instructions of a first specified type that are retired by the first processing core. In one embodiment, a performance scalability of the second processing core is determined and the more scalable of the first and second processing cores is selected. A frequency of the more scalable processing core may then be increased. In one or more embodiments, a power scalability of the first and the second processors is determined from a power measurement sensor or indicator of the processor. In at least one embodiment, the frequency of the processing core with the greater performance scalability is increased.

In at least one embodiment, a disclosed method of performance scalability includes providing a first clock signal to a first processing core and a second clock signal to a second processing core, initializing a performance indicator counter, and operating at an initial frequency of the first clock signal for a first duration. In some embodiments, a first performance value of the first processing core is determined based on the performance indicator counter. In at least one embodiment, the first processing core is operated at a second frequency of the first clock signal for a second duration and a determination, based on the performance indicator counter, of a second performance value of the first processing core is performed. In some embodiments, a determination of a performance scalability of the first processing core based on the initial performance value and the second performance value is performed. In some embodiments, the first processing core is operated at a third frequency of the first clock signal. In at least one embodiment, the third frequency is based on the performance scalability.

In at least one embodiment, the performance indicator counter indicates instructions retired by the first processing core. In some embodiments, the performance indicator counter indicates instructions of a first type retired. In at least one embodiment, the method further includes determining a performance scalability of the second processing core, identifying a more scalable of the first processing core and the second processing core, and modifying a frequency of the more scalable processor. In at least one embodiment, a determination, from a power measurement reading, of a power scalability of the first processor and the second processor is performed and a frequency of a more power scalable processing core is increased. In some embodiments, operating at the second frequency for the second duration includes operating at the second clock signal for a duration not exceeding 10 milliseconds.

In at least one embodiment, a disclosed computer readable storage medium includes processor-executable instructions to cause a processor to perform operations including providing a first clock signal to a first processing core and a second clock signal to a second processing core, initializing a performance indicator counter, and operating the first processing core at an initial frequency of the first clock signal for a first duration. In some embodiments, the operations further include determining, based on the performance indicator counter, a first performance value of the first processing core. In at least one embodiment, the operations include operating at a second frequency of the first clock signal for a second duration and determining, based on the performance indicator counter, a second performance value of the first processing core. In at least one embodiment, the operations include determining a performance scalability of the first processing core based on the initial performance value and the second performance value. In at least one embodiment, operating at the second frequency for the second duration includes operating at the second clock signal for a duration not exceeding 10 milliseconds. In some embodiments, the operations also include operating at a third frequency of the first clock signal, wherein the third frequency is based on the performance scalability.

In some embodiments, the performance indicator counter indicates instructions retired by the first processing core. In at least one embodiment, the performance indicator counter indicates instructions of a first type retired. In some embodiments, the operations include determining a performance scalability of the second processing core, identifying a more scalable of the first processing core and the second processing core, and modifying a frequency of the more scalable processor. In at least one embodiment, the operations include determining, from a power measurement reading, a power scalability of the first processor and the second processor and increasing a frequency of a more power scalable processing core.

In the following description, details are set forth in conjunction with embodiments to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

Embodiments may be implemented in many different system types and platforms. FIG. 1 illustrates a multi-core processor used in conjunction with at least one embodiment. In at least one embodiment, system 100 includes a multiprocessor system that includes a first processor 170-1 and a second processor 170-2. While some embodiments, include two processors 170, other embodiments may include more or fewer processors. In at least one embodiment, each processor 170 includes a core region 178 and an uncore region 180. In some embodiments, core region 178 includes one or more processing cores 174. In at least one embodiment, uncore region 180 includes a memory controller hub (MCH) 172, a processor-hub point-to-point interface 176, and a processor-processor point-to-point interface 173.

In at least one embodiment, MCH 172 supports bidirectional transfer of data between a processor 170 and a system memory 120 via a memory interconnect 182. In some embodiments, system memory 120 may be a double-data rate (DDR) type dynamic random-access memory (DRAM) while memory interconnect 182 and MCH 172 may comply with a DDR interface specification. In at least one embodiment, system memory 120-1 may include a bank of memory interfaces populated with corresponding memory devices or boards.

In at least one embodiment, system 100 is a distributed memory embodiment in which each processor 170 communicates with a local portion of system memory 120. In some embodiments, system memory 120-1 is local to processor 170-1 and represents a portion of the system memory 120 as a whole, which is a shared memory space. In some embodiments, each processor 170 can access each portion of system memory 120, whether local or not. While local accesses may have lower latency, accesses to non-local portions of system memory 120 are permitted in some embodiments.

In some embodiments, each processor 170 also includes a point-to-point interface 173 that supports communication of information with a point-to-point interface 173 of one of the other processors 170 via an inter-processor point-to-point interconnection 151. In some embodiments, processor-hub point-to-point interconnections 152 and processor-processor point-to-point interconnections 151 are distinct instances of a common set of interconnections. In other embodiments, point-to-point interconnections 152 may differ from point-to-point interconnections 151.

In at least one embodiment, processors 170 include point-to-point interfaces 176 to communicate via point-to-point interconnections 152 with a point-to-point interface 194 of an I/O hub 190. In some embodiments, I/O hub 190 includes a graphics interface 192 to support bidirectional communication of data with a display controller 138 via a graphics interconnection 116, which may be implemented as a high speed serial bus, e.g., a peripheral components interface express (PCIe) bus, or another suitable bus.

In some embodiments, I/O hub 190 also communicates, via an interface 196 and a corresponding interconnection 156, with a bus bridge hub 118 that supports various bus protocols for different types of I/O devices or peripheral devices. In at least one embodiment, bus bridge hub 118 supports a network interface controller (NIC) 130 that implements a packet-switched network communication protocol (e.g., Gigabit Ethernet), a sound card or audio adapter 132, and a low bandwidth bus 122 (e.g., low pin count (LPC), 12C, Industry Standard Architecture (ISA)), to support legacy interfaces referred to herein as desktop devices 124 that might include interfaces for a keyboard, mouse, serial port, parallel port, and/or a removable media drive. In some embodiments, low bandwidth bus 122 further includes an interface for a nonvolatile memory (NVM) device such as flash read only memory (ROM) 126 that includes a basic I/O system (BIOS) 131. In at least one embodiment, system 100 also includes a peripheral bus 123 (e.g., USB, PCI, PCIe) to support various peripheral devices including, but not limited to, one or more sensors 112 and a touch screen controller 113.

In at least one embodiment, bus bridge hub 118 includes an interface to a storage protocol bus 121 (e.g., serial AT attachment (SATA), small computer system interface (SCSI)), to support persistent storage 128, including but not limited to magnetic core hard disk drives (HDD), and a solid state drive (SSD). In some embodiments, persistent storage 128 includes code 129 including processor-executable instructions that processor 170 may execute to perform various operations. In at least one embodiment, code 129 may include, but is not limited to, operating system (OS) code 127 and application program code. In some embodiments, system 100 also includes nonvolatile (NV) RAM 140, including but not limited to an SSD and a phase change RAM (PRAM).

Although specific instances of communication busses and transport protocols have been illustrated and described, other embodiments may employ different communication busses and different target devices. Similarly, although some embodiments include one or more processors 170 and a chipset 189 that includes an I/O hub 190 with an integrated graphics interface, and a bus bridge hub supporting other I/O interfaces, other embodiments may include MCH 172 integrated in I/O hub 190 and graphics interface 192 integrated in processor 170. In at least one embodiment that includes integrated MCH 172 and graphics interface 192 in processor 170, I/O hub 190 and bus bridge hub 118 may be integrated into a single-piece chipset 189.

In some embodiments, persistent storage 128 includes code 129 executable by processor 170 to perform operations. In at least one embodiment, code 129 includes code for an OS 127. In at least one embodiment, OS 127 includes a core performance scalability algorithm 142 and an uncore performance scalability algorithm 144 to determine or estimate a performance scalability of processor 170. In some embodiments, OS 127 also includes core power scalability algorithm 146 and uncore power scalability algorithm 148 to determine or estimate a power scalability of processor 170.

In at least one embodiment, OS 127 also includes a sensor API 150, which provides application program access to one or more sensors 112. In at least one embodiment, sensors 112 include, but are not limited to, an accelerometer, a global positioning system (GPS) device, a gyrometer, an inclinometer, and an ambient light sensor. In some embodiments, OS 127 also includes a resume module 154 to reduce latency when transitioning system 100 from a power conservation state to an operating state. In at least one embodiment, resume module 154 may work in conjunction with NV RAM 140 to reduce the amount of storage required when system 100 enters a power conservation mode. Resume module 154 may, in one embodiment, flush standby and temporary memory pages before transitioning to a sleep mode. In some embodiments, by reducing the amount of system memory space that system 100 is required to preserve upon entering a low power state, resume module 154 beneficially reduces the amount of time required to perform the transition from the low power state to an operating state.

In at least one embodiment, OS 127 also includes a connect module 152 to perform complementary functions for conserving power while reducing the amount of latency or delay associated with traditional "wake up" sequences. In some embodiments, connect module 152 may periodically update certain "dynamic" applications including, email and social network applications, so that, when system 100 wakes from a low power mode, the applications that are often most likely to require refreshing are up to date.

Figure 2A:
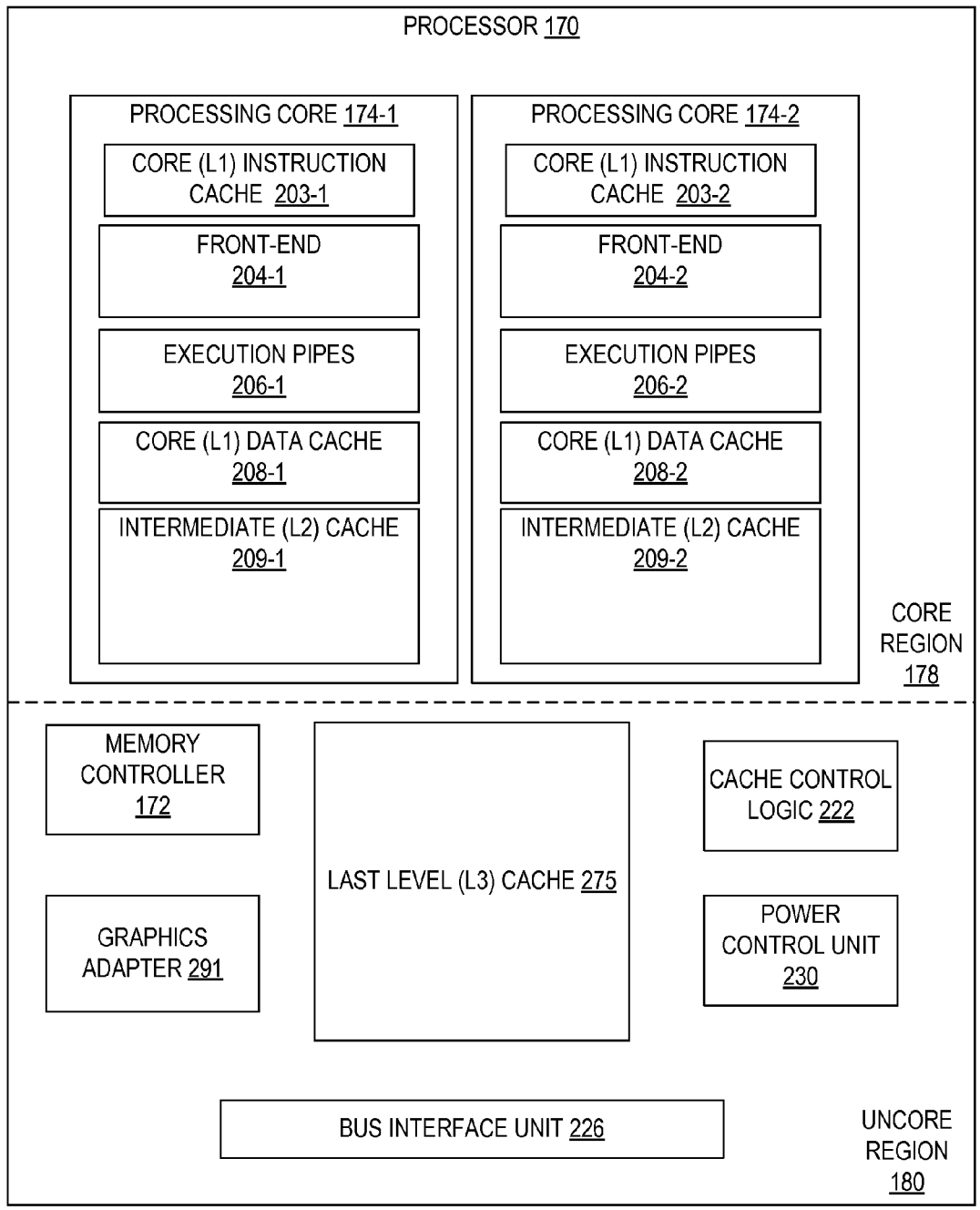
FIG. 2A illustrates a processor used in conjunction with at least one embodiment.

FIG. 2A illustrates a processor used in conjunction with at least one embodiment. In at least one embodiment, processor 170 includes a core region 178 and an uncore region 180. In some embodiments, core region 178 includes processing cores 174-1 and 174-2. Other embodiments of processor 170 may include more or fewer processing cores 174.

In some embodiments, each processing core 174 includes a core or level 1 (L1) instruction cache 203, a front-end 204, execution pipes 206, a core or L1 data cache 208, and an intermediate or level 2 (L2) cache 209. In at least one embodiment, front-end 204 receives or generates program flow information including an instruction pointer and branch predictions, fetches or prefetches instructions from core instruction cache 203 based on the program flow information it receives, and issues instructions to execution pipes 206. In some embodiments, front-end 204 may also perform instruction decoding to identify operation codes, identify source and destination registers, and identify any memory references. In at least one embodiment, execution pipes 206 may include multiple parallel execution pipelines including one or more floating point pipelines, one or more integer arithmetic logic unit pipelines, one or more branch pipelines, and one or more memory access pipelines, also referred to herein as load/store pipelines. In some embodiments, execution pipes 206 may generate micro code to process the instructions from core instruction cache 203, route instructions through the appropriate execution pipeline, and store any results in destination registers. In some embodiments, execution pipes 206 may encompass a register file that may support features including register renaming, speculative execution, and out-of-order execution of instructions.

In at least one embodiment, uncore region 180 includes a last level (L3) cache (LLC) 275 and cache control logic 222. In this embodiment, LLC 275 is a shared resource for all of processing cores 174 of processor 170. In some embodiments, as suggested by its name, LLC 275 represents, from the perspective of processor 170, the last available hierarchical tier of cache memory. In at least one embodiment, if a memory access instruction that is presented to LLC 275 generates a cache miss, the requested data must be retrieved from system memory 120.

In some embodiments, processing core 174 and/or uncore region 180 may include one or more levels of a cache hierarchy between core caches 203, 208, intermediate cache 209, and LLC 275. In some embodiments, each of the cache memories of processing core 174 may have a unique architectural configuration. In at least one embodiment, core data cache 208, intermediate cache 209 and LLC 275 are multiple-way, set associative caches. In some embodiments, LLC 275 is inclusive with respect to intermediate cache 209 while, in other embodiments, LLC 275 may be exclusive or non-inclusive with respect to intermediate cache 209. Similarly, in some embodiments, intermediate cache 209 may be either inclusive or non-inclusive with respect to core data cache 208, core instruction cache 203, or both.

In at least one embodiment, cache control logic 222 controls access to the cache memories, enforces a coherency policy, implements a replacement policy, and monitors memory access requests from external agents, including but not limited to, other processors 170 or I/O devices. In at least one embodiment, LLC 275, intermediate cache 209, and core caches 203, 208 comply with the MESI protocol or a modified MESI protocol. The four states of the MESI protocol are described in Table 1.

TABLE 1

Description of Cacheline States in the MESI Protocol

| MESI State | Description |
| --- | --- |
| Modified | The cache line contains valid data that is modified from the system memory copy of the data. Also referred to as a 'dirty' line. |
| Exclusive | The line contains valid data that is the same as the system memory copy of the data. Also indicates that no other cache has a line allocated to this same system memory address. Also referred to as a 'clean' line. |
| Shared | The line contains valid and clean data, but one or more other caches have a line allocated to this same system memory address. |
| Invalid | The line is not currently allocated and is available for storing a new entry. |

In some embodiments, the cache memories of processor 170 may implement a modified MESI protocol, which might include, in one embodiment, an "F" state identifying one of a plurality of "S" state lines, where the "F" state line is designated as the line to forward the applicable data should an additional request for the data be received from a processor that does not have the data.

In at least one embodiment, uncore region 180 of processor 170 also includes power control unit 230 to control power provided to the various resources of processor 170. In some embodiments, power control unit 230 provides unique power supply levels to core region 178 and uncore region 180. In other embodiments, power control unit 230 may be further operable to provide unique power supply levels to each processing core 174 and/or provide clock signals at unique frequencies to processing cores 174. In addition, in some embodiments, power management unit 230 may implement various power states for processor 170 and define or respond to events that produce power state transitions.

In some embodiments, uncore region 180 includes graphics adapter 291 to support low latency, high bandwidth communication with a display device (not depicted). In some embodiments, the integration of graphics adapter 291 into processor 170 represents an alternative embodiment, in which graphics interface 192 is implemented in the I/O hub 190.

In at least one embodiment, uncore region 180 includes a bus interface unit 226 to support communication with one or more chipset devices, discreet bus interfaces, and/or individual I/O devices. In some embodiments, bus interface unit 226 provides one or more point-to-point interfaces such as the interfaces 176 and 173. In other embodiments, bus interface unit 226 may provide an interface to a shared bus to which one or more other processors 170 may also connect.

Figure 2B:
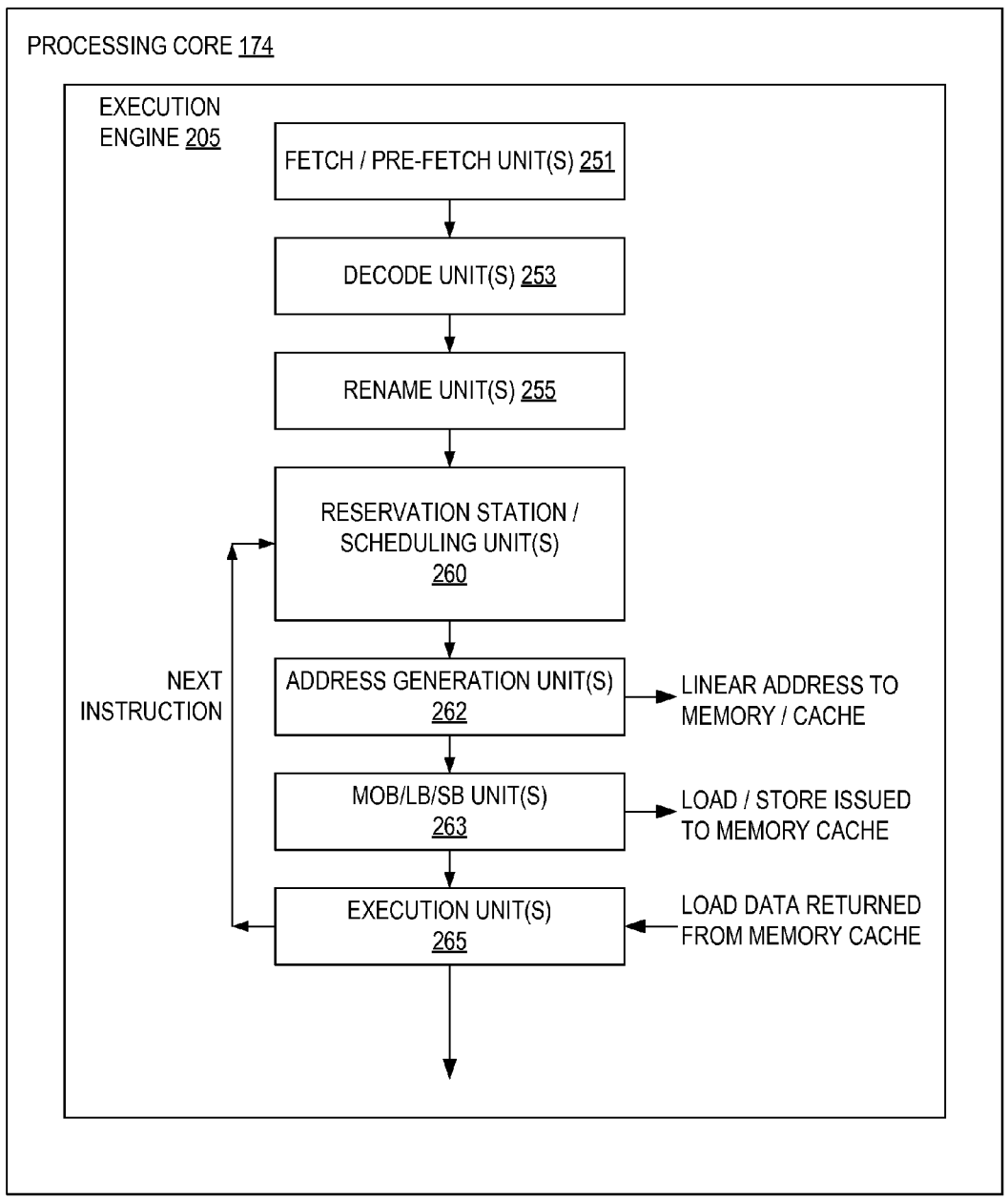
FIG. 2B illustrates a processor used in conjunction with at least one embodiment.

FIG. 2B illustrates an out-of-order execution core. In one embodiment, execution core 205 includes all or some of the elements of front end 204 and execution engine 206 of processing core 174. In at least one embodiment, pending loads may be speculatively issued to a memory address before other older pending store operations according to a prediction algorithm, such as a hashing function. In at least one embodiment, execution core 205 includes a fetch/prefetch unit 251, a decoder unit 253, one or more rename units 255 to assign registers to appropriate instructions or micro-ops, and one or more scheduling/reservation station units 260 to store micro-ops corresponding to load and store operations (e.g., STA micro-ops) until their corresponding target addresses source operands are determined. In some embodiments an address generation unit 262 to generate the target linear addresses corresponding to the load and stores, and an execution unit 265 to generate a pointer to the next operation to be dispatched from the scheduler/reservation stations 260 based on load data returned by dispatching load operations to memory/cache are also included. In at least one embodiment, a memory order buffer (MOB) 263, which may contain load and store buffers to store loads and stores in program order and to check for dependencies/conflicts between the loads and stores is included. In one embodiment, loads may be issued to memory/cache before older stores are issued to memory/cache without waiting to determine whether the loads are dependent upon or otherwise conflict with older pending stores. In other embodiments, processor 170 is an in-order processor.

Figure 3:
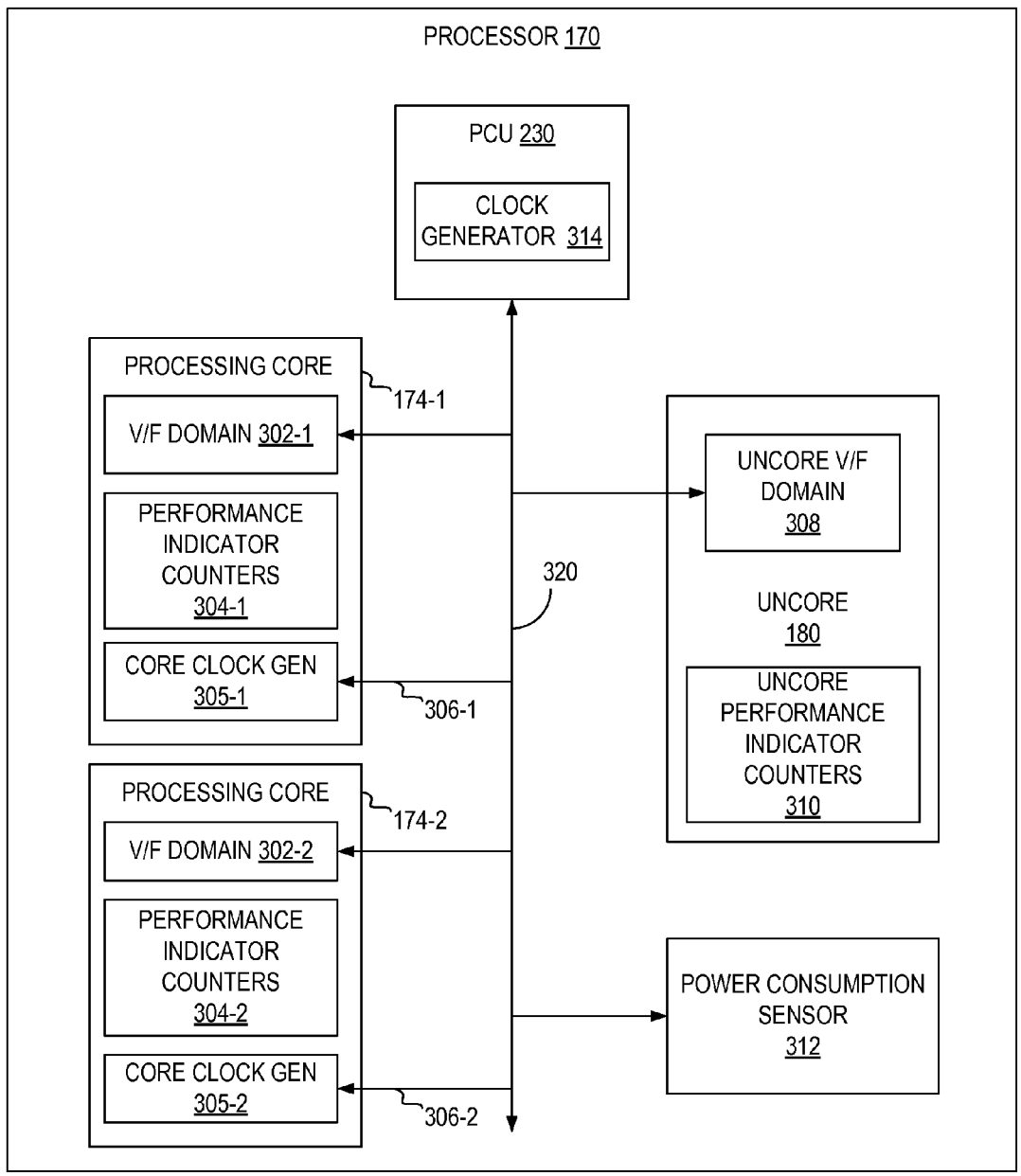
FIG. 3 illustrates a processor used in conjunction with at least one embodiment.

FIG. 3 illustrates a processor used in conjunction with at least one embodiment. In at least one embodiment, processor 170 emphasizes the role of PCU 230 in scalability determination techniques described herein. In some embodiments, PCU 230 may provide independent voltage/frequency (V/F) domains 302 to each of the two processing cores 174-1 and 174-2 and a separate V/F domain 308 to uncore region 180 via an on-die V/F interconnect 320. In some embodiments, although PCU 230 is illustrated in FIG. 2A within uncore region 180, in other embodiments PCU 230 may be used to provide V/F domains to the other elements of uncore region 180.

In some embodiments, PCU 230 includes clock generator 314 for generating one or more clock signals 306 provided to a core clock generator 305 for each processing core 174 via V/F interconnection 320. In some embodiments, each processing core 174 includes performance indicator counters 304, which may be readable by PCU 230 at runtime during normal operation. In at least one embodiment, processor 170 includes power consumption sensor 312 that has the ability to measure the power consumed by the processor. In some embodiments, uncore region 180 may also include an uncore V/F domain 308 and a set of uncore performance indicator counters 310. In at least one embodiment, the uncore set of performance indicator counters 310 is also readable by PCU 230 at runtime during normal operation.

While some embodiments include separate V/F domains per core 174 and another V/F domain for uncore 180, other embodiments may include a single unified V/F domain for all cores 174 and uncore 180. In at least one embodiment, single V/F domain for all cores 174 and a separate V/F domain for uncore 180 is included.

Figure 4:
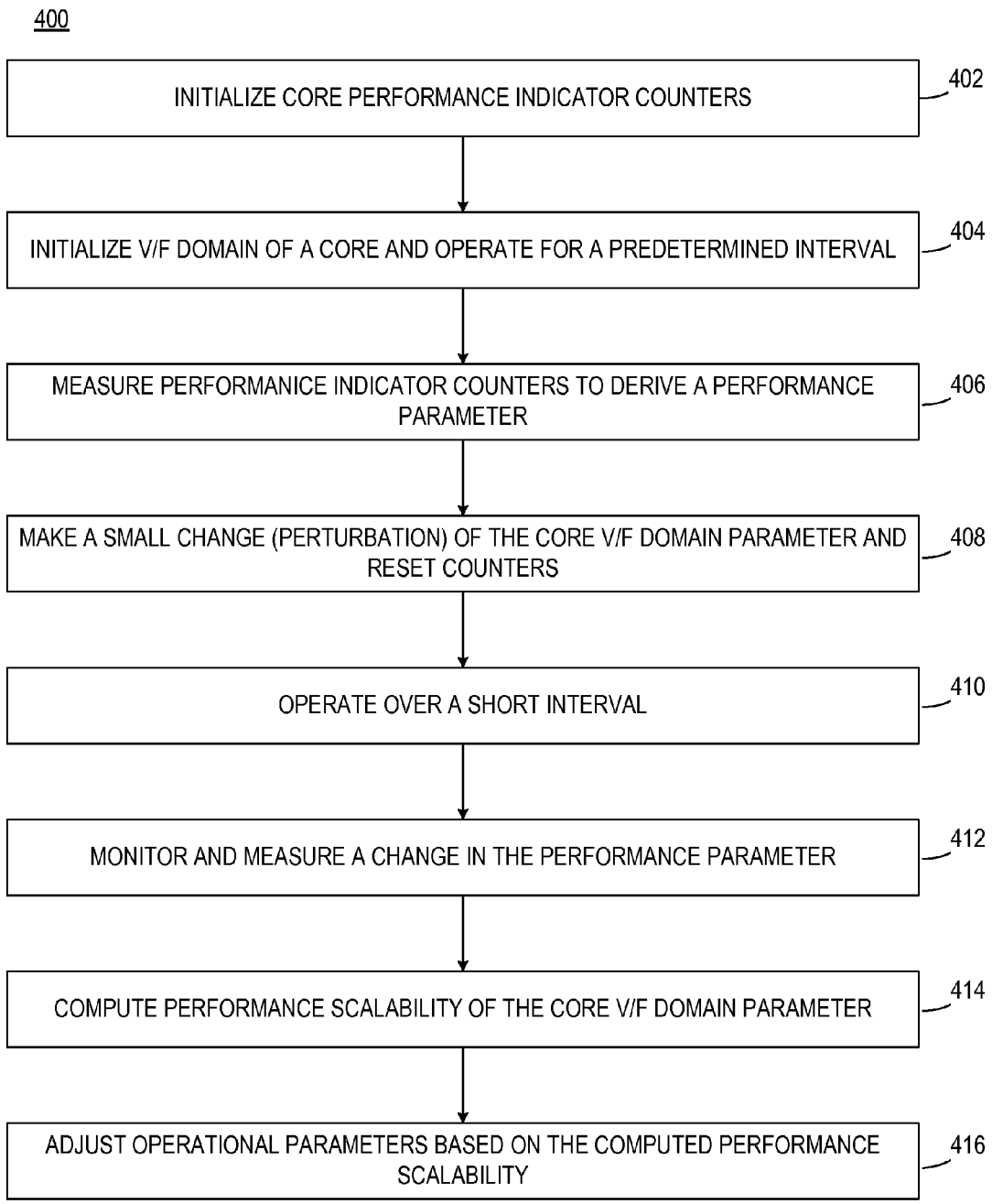
FIG. 4 illustrates one embodiment of a method of computing performance scalability for a core region of a processor.

FIG. 4 illustrates one embodiment of a method of computing performance scalability for a core region of a processor. In at least one embodiment, method 400 includes initializing core performance indicator counters (block 402). In some embodiments, the core V/F domain parameter is set at a first value and the operation is performed for a predetermined interval (block 404). Next, in block 406, the performance indicator counters are, in some embodiments, monitored and measured to derive a performance parameter. In some embodiments, a perturbation, or small change, of a core V/F domain parameter is made and the counters are reset (block 408). In at least one embodiment, the system is operated over a short interval (block 410), and the performance indicator counters are again monitored and measured for a change in performance (block 412). In some embodiments, performance scalability is computed of the core V/F domain parameter (block 414). Based on the computed performance scalability, the operational parameter is adjusted (block 416) in some embodiments.

In some embodiments, frequency perturbations may include naturally occurring perturbations, small adjustments in frequency made by a power control unit to satisfy other power management algorithms. In some embodiments, perturbations can be artificial as well, made by power control unit 230 specifically for scalability measurements. In at least one embodiment, the power control unit can make artificial perturbations at regular intervals. Alternatively, in some embodiments, the power control unit can make perturbations when no natural perturbations have occurred recently.

Because perturbations have a performance cost, making perturbation-based measurements too frequently can reduce overall performance. In at least one embodiment, perturbations are avoided if they become too frequent. In at least one embodiment, if a V/F domain change takes 10 µs then making a scalability based measurement every 10 ms will cost less than 0.2% performance which may be an acceptable cost. For environments where the performance cost of a single perturbation is very low, in some embodiments, perturbation-based scalability measurements can be made frequently. In at least one embodiment, the power control unit can choose to increase frequency for just a few microseconds, judge the resulting impact, and move frequency back quickly if the scalability is not sufficient to justify the cost with respect to increased power consumption.

Figure 5:
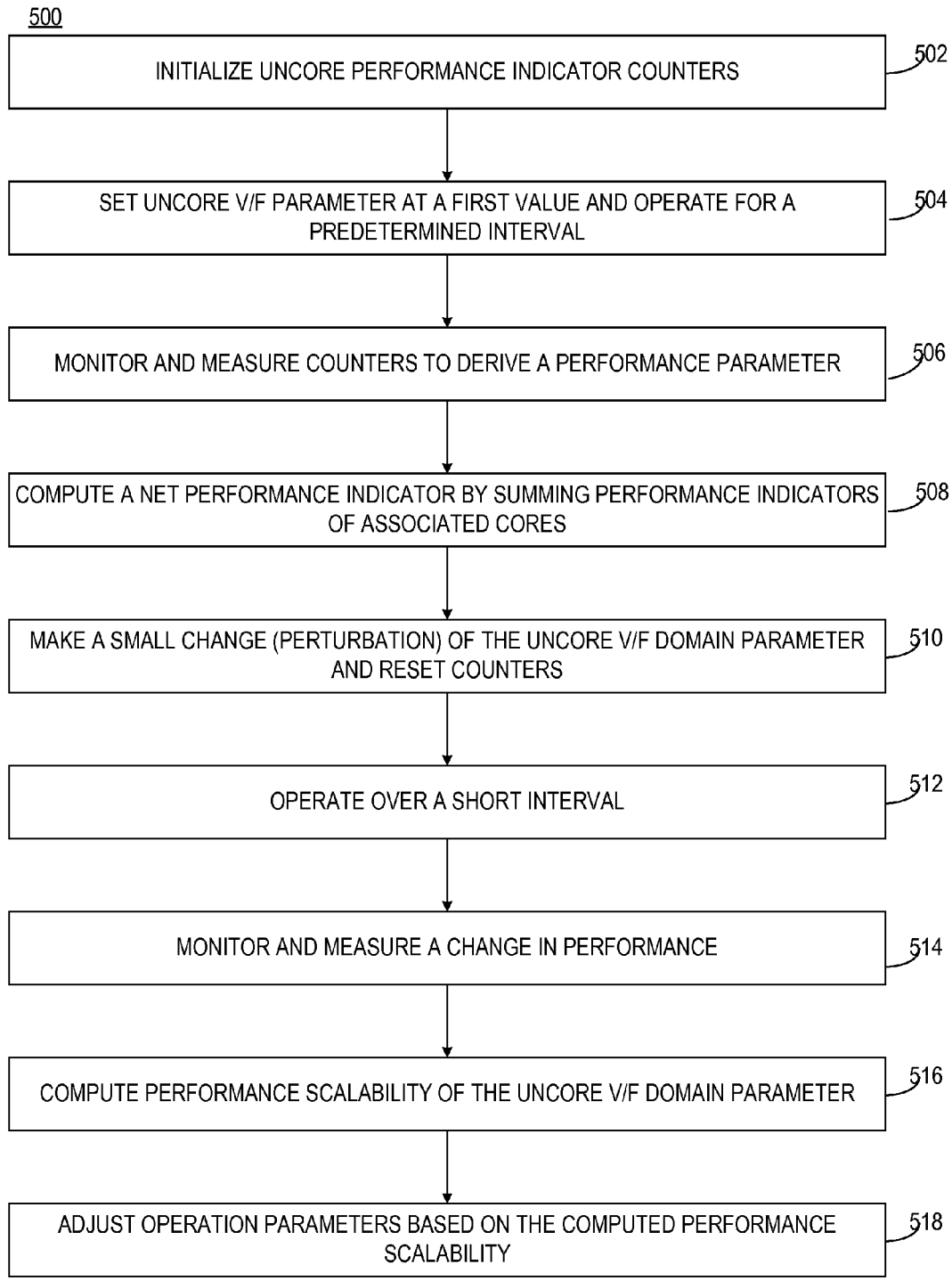
FIG. 5 illustrates one embodiment of a method of computing performance scalability for an uncore region of a processor.

FIG. 5 illustrates one embodiment of a method of computing performance scalability for an uncore region of a processor. In at least one embodiment, method 500 includes initializing (block 502) one or more uncore performance indicator counters. In some embodiments, an uncore V/F domain parameter is set (block 504) at a first value and the system is operated for a predetermined interval. In some embodiments, the performance indicator counters are monitored and measured to derive a performance parameter (block 506). In at least one embodiment, a net performance indicator may be computed by summing performance indicators of associated cores (block 508). In some embodiments, a perturbation, or a small change, of the uncore V/F domain parameter is made and the counters are reset (block 510). In at least one embodiment, the system is then operated over a short interval (block 512), and the performance indicator counters are again monitored and measured for a change in performance (block 514). In some embodiments, performance scalability is computed of the uncore V/F domain parameter (block 516). Based on the computed performance scalability, one or more operational parameter may be adjusted (block 518) in some embodiments. In some embodiments, the operational parameters that may be adjusted include the V/F domain parameters of each individual V/F domain including, but not limited to, clock signal frequency and power domain supply voltage.

Figure 6:
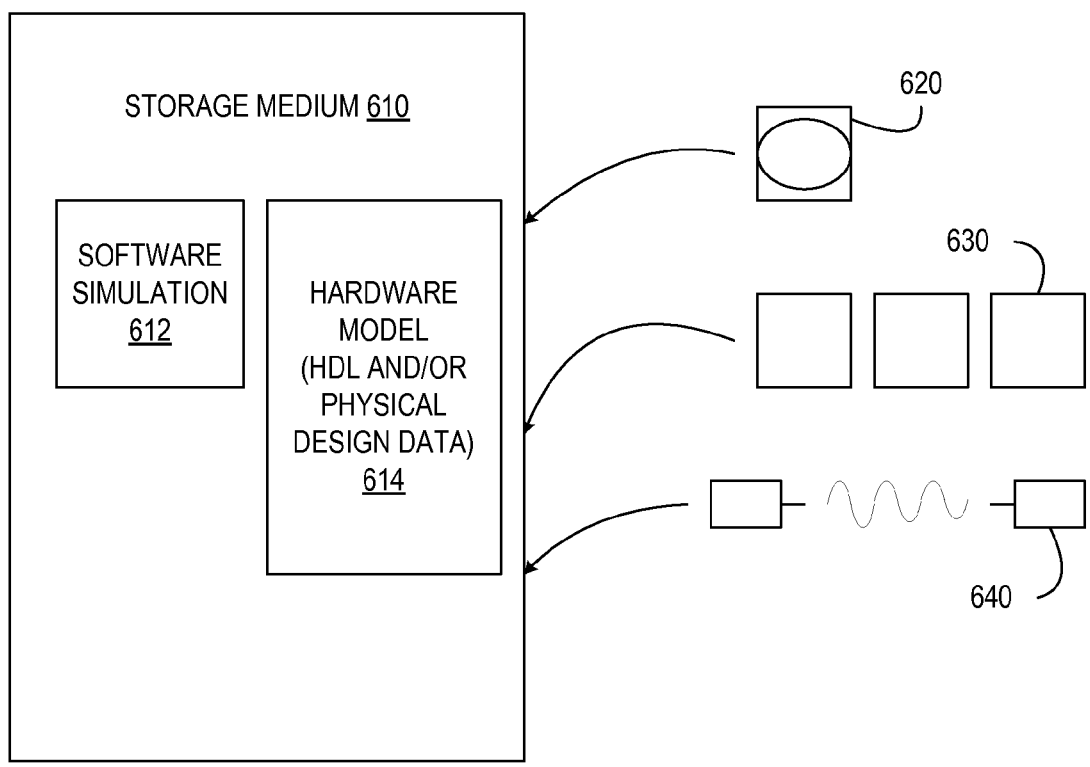
FIG. 6 illustrates a representation for simulation, emulation and fabrication of a design implementing the disclosed techniques.

FIG. 6 illustrates a representation for simulation, emulation and fabrication of a design implementing the disclosed techniques. Data representing a design may represent the design in a number of manners. First, as is useful in simulations, the hardware may be represented using a hardware description language or another functional description language which basically provides a computerized model of how the designed hardware is expected to perform. In at least one embodiment, the hardware model 614 may be stored in a storage medium 610 such as a computer memory so that the model may be simulated using simulation software 612 that applies a particular test suite to the hardware model 614 to determine if it indeed functions as intended. In some embodiments, the simulation software 612 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. In some embodiments, an optical or electrical wave 640 modulated or otherwise generated to transmit such information, a memory 630, or a magnetic or optical storage 620 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

The following pertain to further embodiments.

Embodiment 1 is a computer system comprising a processor including: a first processing core; and a second processing core; a power control unit to provide a first clock signal to the first processing core and a second clock signal to the second processing core; and a computer readable storage medium to store scalability algorithm instructions, executable by the processor, to cause the processor to: initialize a performance indicator counter; operate at an initial frequency of the first clock signal for a first duration; determine, based on the performance indicator counter, a first performance value of the first processing core; operate at a second frequency of the first clock signal for a second duration; determine, based on the performance indicator counter, a second performance value of the first processing core; and determine a performance scalability of the first processing core based on the initial performance value and the second performance value.

In embodiment 2, the instructions included in the subject matter of embodiment 1 can optionally include instructions to cause the processor to operate at a third frequency of the first clock signal, wherein the third frequency is based on the performance scalability.

In embodiment 3, the performance indicator counter included in the subject matter of embodiment 1 can optionally indicate instructions retired by the first processing core.

In embodiment 4, the performance indicator counter included in the subject matter of embodiment 3 can optionally indicate instructions of a first type retired.

In embodiment 5, the instructions included in the subject matter of embodiment 1 can optionally include instructions to cause the processor to: determine a performance scalability of the second processing core; identify a more scalable of the first processing core and the second processing core; and modify a frequency of the more scalable processor.

In embodiment 6, the instructions included in the subject matter of embodiment 5 can optionally include instructions to cause the processor to determine, from a power measurement reading, a power scalability of the first processor and the second processor; and increase a frequency of a more power scalable processing core.

In embodiment 7, the operating at the second frequency for the second duration included in the subject matter of embodiment 1 can optionally include operating at the second clock signal for a duration not exceeding 10 milliseconds.

Embodiment 8 is a performance scalability method comprising: providing a first clock signal to a first processing core and a second clock signal to a second processing core; initializing a performance indicator counter; operating at an initial frequency of the first clock signal for a first duration; determining, based on the performance indicator counter, a first performance value of the first processing core; operating at a second frequency of the first clock signal for a second duration; determining, based on the performance indicator counter, a second performance value of the first processing core; and determining a performance scalability of the first processing core based on the initial performance value and the second performance value.

In embodiment 9, the subject matter of embodiment 8 can optionally include operating at a third frequency of the first clock signal, wherein the third frequency is based on the performance scalability.

In embodiment 10, the performance indicator counter included in the subject matter of embodiment 8 can optionally indicate instructions retired by the first processing core.

In embodiment 11, the performance indicator counter included in the subject matter of embodiment 10 can optionally indicate instructions of a first type retired.

In embodiment 12, the subject matter of embodiment 8 can optionally include determining a performance scalability of the second processing core; identifying a more scalable of the first processing core and the second processing core; and modifying a frequency of the more scalable processor.

In embodiment 13, the subject matter of embodiment 12, can optionally include determining, from a power measurement reading, a power scalability of the first processor and the second processor; and increasing a frequency of a more power scalable processing core.

In embodiment 14, the operating at the second frequency for the second duration included in the subject matter of embodiment 8 can optionally include operating at the second clock signal for a duration not exceeding 10 milliseconds.

Embodiment 15 is a computer readable storage medium including processor-executable instructions to cause a processor to perform operations comprising providing a first clock signal to a first processing core and a second clock signal to a second processing core; initializing a performance indicator counter; operating at an initial frequency of the first clock signal for a first duration; determining, based on the performance indicator counter, a first performance value of the first processing core; operating at a second frequency of the first clock signal for a second duration; determining, based on the performance indicator counter, a second performance value of the first processing core; and determining a performance scalability of the first processing core based on the initial performance value and the second performance value.

In embodiment 16, the subject matter of embodiment 15 can optionally include operating at a third frequency of the first clock signal, wherein the third frequency is based on the performance scalability.

In embodiment 17, the performance indicator counter included in the subject matter of embodiment 15 can optionally indicate instructions retired by the first processing core.

In embodiment 18, the performance indicator counter included in the subject matter of embodiment 17 can optionally indicate instructions of a first type retired.

In embodiment 19, the subject matter of embodiment 15 can optionally include determining a performance scalability of the second processing core; identifying a more scalable of the first processing core and the second processing core; and modifying a frequency of the more scalable processor.

In embodiment 20, the subject matter of embodiment 19 can optionally include determining, from a power measurement reading, a power scalability of the first processor and the second processor; and increasing a frequency of a more power scalable processing core.

In embodiment 21, the operating at the second frequency for the second duration included in the subject matter of embodiment 15 can optionally include operating at the second clock signal for a duration not exceeding 10 milliseconds.

In embodiment 22, the operating at the second frequency for the second duration included in the subject matter of any one of embodiments 1-6 can optionally include operating at the second clock signal for a duration not exceeding 10 milliseconds.

In embodiment 23, the subject matter of any one of embodiments 8-11 can optionally include determining a performance scalability of the second processing core; identifying a more scalable of the first processing core and the second processing core; and modifying a frequency of the more scalable processor.

In embodiment 24, the performance indicator counter included in the subject matter of any one of embodiments 15, 16, 18, 19, 20, or 21 can optionally indicate instructions retired by the first processing core.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A processor comprising:
   a first processing core;
   a second processing core; and
   a power control unit to provide a first clock signal to the first processing core and a second clock signal to the second processing core, the power control unit to:
   initialize a performance indicator counter;
   cause the first processing core to operate at an initial frequency of the first clock signal for a first duration;
   after the first duration, determine, based on the performance indicator counter, a first performance value of a first performance parameter of the first processing core;
   cause the first processing core to operate at a second frequency of the first clock signal for a second duration, the second duration substantially shorter than the first duration;
   after the second duration, determine, based on the performance indicator counter, a second performance value of the first performance parameter of the first processing core;
   calculate a performance scalability of the first performance parameter of the first processing core based on the first performance value and the second performance value;
   modify at least one of the first clock signal and the second clock signal based on the performance scalability, including to cause the first processing core to operate at the second frequency of the first clock signal for the second duration and to return to operate at the initial frequency of the first clock signal if the performance scalability is less than a first threshold value, wherein the first threshold value is based on an acceptable performance cost.

2. The processor of claim 1, wherein the power control unit is to cause at least one of the first processing core and the second processing core to:
   operate at a third frequency of the first clock signal, wherein the third frequency is based on the performance scalability.

3. The processor of claim 1, wherein the performance indicator counter is to indicate instructions retired by the first processing core.

4. The processor of claim 3, wherein the performance indicator counter is to indicate instructions of a first type retired.

5. The processor of claim 1, wherein the power control unit is to:
- determine a performance scalability of the second processing core;
- identify a more scalable of the first processing core and the second processing core; and
- modify a frequency of the more scalable processing core.

6. The processor of claim 5, wherein the power control unit is to:
- determine, from a power measurement reading, a power scalability of the first processing core and the second processing core; and
- increase a frequency of a more power scalable processing core.

7. A method, comprising:
- providing a first clock signal to a first processing core and a second clock signal to a second processing core;
- initializing a performance indicator counter;
- causing the first processing core to operate at an initial frequency of the first clock signal for a first duration;
- after the first duration, determining, based on the performance indicator counter, a first performance value of a first performance parameter of the first processing core;
- causing the first processing core to operate at a second frequency of the first clock signal for a second duration, the second duration substantially shorter than the first duration;
- after the second duration, determining, based on the performance indicator counter, a second performance value of the first performance parameter of the first processing core;
- calculating a performance scalability of the first performance parameter of the first processing core based on the first performance value and the second performance value; and
- causing the first processing core to return to operate at the initial frequency of the first clock signal after the second duration if the performance scalability is less than a first threshold value, wherein the first threshold value is based on an acceptable performance cost.

8. The method of claim 7, further comprising:
- operating at a third frequency of the first clock signal, wherein the third frequency is based on the performance scalability.

9. The method of claim 7, wherein the performance indicator counter indicates instructions retired by the first processing core.

10. The method of claim 9, wherein the performance indicator counter indicates instructions of a first type retired.

11. The method of claim 7, further comprising:
- determining a performance scalability of the second processing core;
- identifying a more scalable of the first processing core and the second processing core; and
- modifying a frequency of the more scalable processing core.

12. The method of claim 11, further comprising:
- determining, from a power measurement reading, a power scalability of the first processing core and the second processing core; and
- increasing a frequency of a more power scalable processing core.

13. A non-transitory computer readable storage medium including processor-executable instructions to cause a processor to perform operations comprising:
- providing a first clock signal to a first processing core and a second clock signal to a second processing core initializing a performance indicator counter;
- causing the first processing core to operate at an initial frequency of the first clock signal for a first duration;
- after the first duration, determining, based on the performance indicator counter, a first performance value of a first performance parameter of the first processing core;
- causing the first processing core to operate at a second frequency of the first clock signal for a second duration, the second duration substantially shorter than the first duration;
- after the second duration, determining, based on the performance indicator counter, a second performance value of the first performance parameter of the first processing core;
- calculating a performance scalability of the first performance parameter of the first processing core based on the first performance value and the second performance value; and
- causing the first processing core to return to operate at the initial frequency of
- the first clock signal after the second duration if the performance scalability is less than a first threshold value, wherein the first threshold value is based on an acceptable performance cost.

14. The non-transitory computer readable storage medium of claim 13, further comprising instructions to cause the processor to perform operations comprising:
- operating at a third frequency of the first clock signal, wherein the third frequency is based on the performance scalability.

15. The non-transitory computer readable storage medium of claim 13, wherein the performance indicator counter indicates instructions retired by the first processing core.

16. The non-transitory computer readable storage medium of claim 15, wherein the performance indicator counter indicates instructions of a first type retired.

17. The non-transitory computer readable storage medium of claim 13, further comprising instructions to cause the processor to perform operations comprising:
- determining a performance scalability of the second processing core;
- identifying a more scalable of the first processing core and the second processing core; and
- modifying a frequency of the more scalable processing core.

18. The non-transitory computer readable storage medium of claim 17, further comprising instructions to cause the processor to perform operations comprising:
- determining, from a power measurement reading, a power scalability of the first processing core and the second processing core; and
- increasing a frequency of a more power scalable processing core.

* * * * *